(12) United States Patent
Zhou

(10) Patent No.: US 11,774,726 B2
(45) Date of Patent: Oct. 3, 2023

(54) CAMERA OPTICAL LENS

(71) Applicant: Raytech Optical (Changzhou) Co., Ltd, Changzhou (CN)

(72) Inventor: Xuepeng Zhou, Shenzhen (CN)

(73) Assignee: Raytech Optical (Changzhou) Co., Ltd., Changzhou (CN)

( * ) Notice: Subject to any disclaimer, the term of this patent is extended or adjusted under 35 U.S.C. 154(b) by 413 days.

(21) Appl. No.: 17/134,556

(22) Filed: Dec. 28, 2020

(65) Prior Publication Data

US 2022/0075157 A1     Mar. 10, 2022

(30) Foreign Application Priority Data

Sep. 10, 2020 (CN) .......................... 202010943879.9

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ... G02B 3/02; G02B 9/62; G02B 9/64; G02B 13/0045; G02B 15/146; G02B 27/0025; H04N 5/222; H04N 5/2254; H04N 23/55

USPC ......... 359/656–658, 708, 713, 749, 756–762
See application file for complete search history.

(56) References Cited

U.S. PATENT DOCUMENTS

| | | | |
|---|---|---|---|
| 10,139,597 B2* | 11/2018 | Teraoka | G02B 9/62 |
| 10,663,695 B2* | 5/2020 | Nitta | G02B 13/0045 |
| 2016/0170182 A1* | 6/2016 | Tanaka | G02B 13/0045 359/713 |
| 2016/0341934 A1* | 11/2016 | Mercado | H04N 23/51 |
| 2018/0188496 A1* | 7/2018 | Hsieh | G02B 9/62 |
| 2019/0137735 A1* | 5/2019 | Jung | G02B 13/0045 |

* cited by examiner

*Primary Examiner* — Travis S Fissel
*Assistant Examiner* — Daniel Jeffery Jordan
(74) *Attorney, Agent, or Firm* — W&G Law Group

(57) ABSTRACT

Disclosed is a camera optical lens including six lenses from an object side to an image side being: a first lens with a positive refractive power, a second lens with a negative refractive power, a third lens with a negative refractive power, a fourth lens with a positive refractive power, a fifth lens with a negative refractive power, and a sixth lens with a negative refractive power. The camera optical lens satisfies: $65.00 \le v1 \le 90.00$; $2.00 \le d8/d9 \le 8.00$; wherein, v1 denotes an abbe number of the first lens, d8 denotes an on-axis distance from an image-side surface of the fourth lens to an object-side surface of the fifth lens, and d9 denotes an on-axis thickness of the fifth lens.

11 Claims, 9 Drawing Sheets

CAMERA OPTICAL LENS

TECHNICAL FIELD

The present disclosure relates to the field of optical lenses, in particular, to a camera optical lens suitable for handheld devices, such as smart phones and digital cameras, and imaging devices, such as monitors or PC lenses.

BACKGROUND

With the emergence of smart phones in recent years, the demand for miniature camera lenses is increasing day by day, but in general the photosensitive devices of camera lens are nothing more than a charge coupled device (CCD) or a complementary metal-oxide semiconductor sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece and six-piece lens lens structure gradually appear in lens designs. Although the six-piece lens already has good optical performance, its optical focal power, lens spacing and lens shape are still unreasonable, resulting in the lens structure still cannot meet the design requirements of a large aperture, ultra-thin and a long focal length while having good optical performance.

SUMMARY

Some embodiments of this disclosure provide a camera optical lens, including six lenses, the six lenses from an object side to an image side being: a first lens having a positive refractive power, a second lens having a negative refractive power; a third lens having a negative refractive power; a fourth lens with a positive refractive power; a fifth lens with a negative refractive power and a sixth lens with a negative refractive power.

The camera optical lens satisfies a condition of $65.00 \leq v1 \leq 90.00$; $2.00 \leq d8/d9 \leq 8.00$. Herein, v1 denotes an abbe number of the first lens, d8 denotes an on-axis distance from an image-side surface of the fourth lens to an object-side surface of the fifth lens, and d9 denotes an on-axis thickness of the fifth lens.

Preferably, the camera optical lens further satisfies a condition of $1.50 \leq f4/f \leq 4.00$. Herein, f denotes a focal length of the camera optical lens, and f4 denotes a focal length of the fourth lens.

Preferably, the camera optical lens further satisfies a condition of $R12/R11 \leq -1.50$. Herein, R11 denotes a central curvature radius of an object-side surface of the sixth lens, and R12 denotes a central curvature radius of an image-side surface of the sixth lens.

Preferably, the camera optical lens further satisfies a condition of $0.23 \leq f1/f \leq 0.84$, $-1.87 \leq (R1+R2)/(R1-R2) \leq -0.46$, $0.09 \leq d1/TTL \leq 0.30$. Herein, f denotes a focal length of the camera optical lens, f1 denotes a focal length of the first lens, R1 denotes a central curvature radius of an object-side surface of the first lens, R2 denotes a central curvature radius of an image-side surface of the first lens, d1 denotes an on-axis thickness of the first lens and TTL denotes a total optical length from the object-side surface of the first lens to an image surface of the camera optical lens along an optical axis.

Preferably, the camera optical lens further satisfies a condition of $-7.78 \leq f2/f \leq -1.79$, $-2.02 \leq (R3+R4)/(R3-R4) \leq 4.85$, $0.02 \leq d3/TTL \leq 0.07$. Herein, f denotes a focal length of the camera optical lens, f2 denotes a focal length of the second lens, R3 denotes a central curvature radius of an object-side surface of the second lens, R4 denotes a central curvature radius of an image-side surface of the second lens, d3 denotes an on-axis thickness of the second lens and TTL denotes a total optical length from the object-side surface of the first lens to an image surface of the camera optical lens along an optical axis.

Preferably, the camera optical lens further satisfies a condition of $-1.59 \leq f3/f \leq -0.39$, $-1.45 \leq (R5+R6)/(R5-R6) \leq -0.36$, $0.02 \leq d5/TTL \leq 0.07$. Herein, f denotes a focal length of the camera optical lens, f3 denotes a focal length of the third lens, R5 denotes a central curvature radius of an object-side surface of the third lens, R6 denotes a central curvature radius of an image-side surface of the third lens, d5 denotes an on-axis thickness of the third lens and TTL denotes a total optical length from the object-side surface of the first lens to an image surface of the camera optical lens along an optical axis.

Preferably, the camera optical lens further satisfies a condition of $-7.93 \leq (R7+R8)/(R7-R8) \leq -1.42$, $0.02 \leq d7/TTL \leq 0.07$. Herein, R7 denotes a central curvature radius of an object-side surface of the fourth lens, R8 denotes a central curvature radius of an image-side surface of the fourth lens, d7 denotes an on-axis thickness of the fourth lens and TTL denotes a total optical length from the object-side surface of the first lens to an image surface of the camera optical lens along an optical axis.

Preferably, the camera optical lens further satisfies a condition of $-3.02 \leq f5/f \leq -0.94$, $0.85 \leq (R9+R10)/(R9-R10) \leq 2.96$, $0.02 \leq d9/TTL \leq 0.10$. Herein, f denotes a focal length of the camera optical lens, f5 denotes a focal length of the fifth lens, R9 denotes a central curvature radius of an object-side surface of the fifth lens, R10 denotes a central curvature radius of an image-side surface of the fifth lens, and TTL denotes a total optical length from the object-side surface of the first lens to an image surface of the camera optical lens along an optical axis.

Preferably, the camera optical lens further satisfies a condition of $-124.82 \leq f6/f \leq 82.03$, $-1.77 \leq (R11+R12)/(R11-R12) \leq -0.14$, $0.05 \leq d11/TTL \leq 0.20$. Herein, f denotes a focal length of the camera optical lens, f6 denotes a focal length of the sixth lens, R11 denotes a central curvature radius of an object-side surface of the sixth lens, R12 denotes a central curvature radius of an image-side surface of the sixth lens, d11 denotes an on-axis thickness of the sixth lens and TTL denotes a total optical length from the object-side surface of the first lens to an image surface of the camera optical lens along an optical axis.

Preferably, the camera optical lens further satisfies a condition of $TTL/IH \leq 2.15$. Herein, IH denotes an image height of the camera optical lens, and TTL denotes a total optical length from the object-side surface of the first lens to an image surface of the camera optical lens along an optical axis.

Preferably, the camera optical lens further satisfies a condition of f/IH≥2.20. Herein, IH denotes an image height of the camera optical lens.

Preferably, the first lens is made of glass material.

BRIEF DESCRIPTION OF DRAWINGS

In order to make more clearly technical solutions of embodiments in the present disclosure, accompanying drawings, which are used in the description of the embodiments, will be described briefly in the following. Obviously, the accompanying drawings in the following description are only some examples of the present disclosure. Those skilled in the art, without creative work, may obtain other drawings based on these drawings.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

First Embodiment

Figure 1:
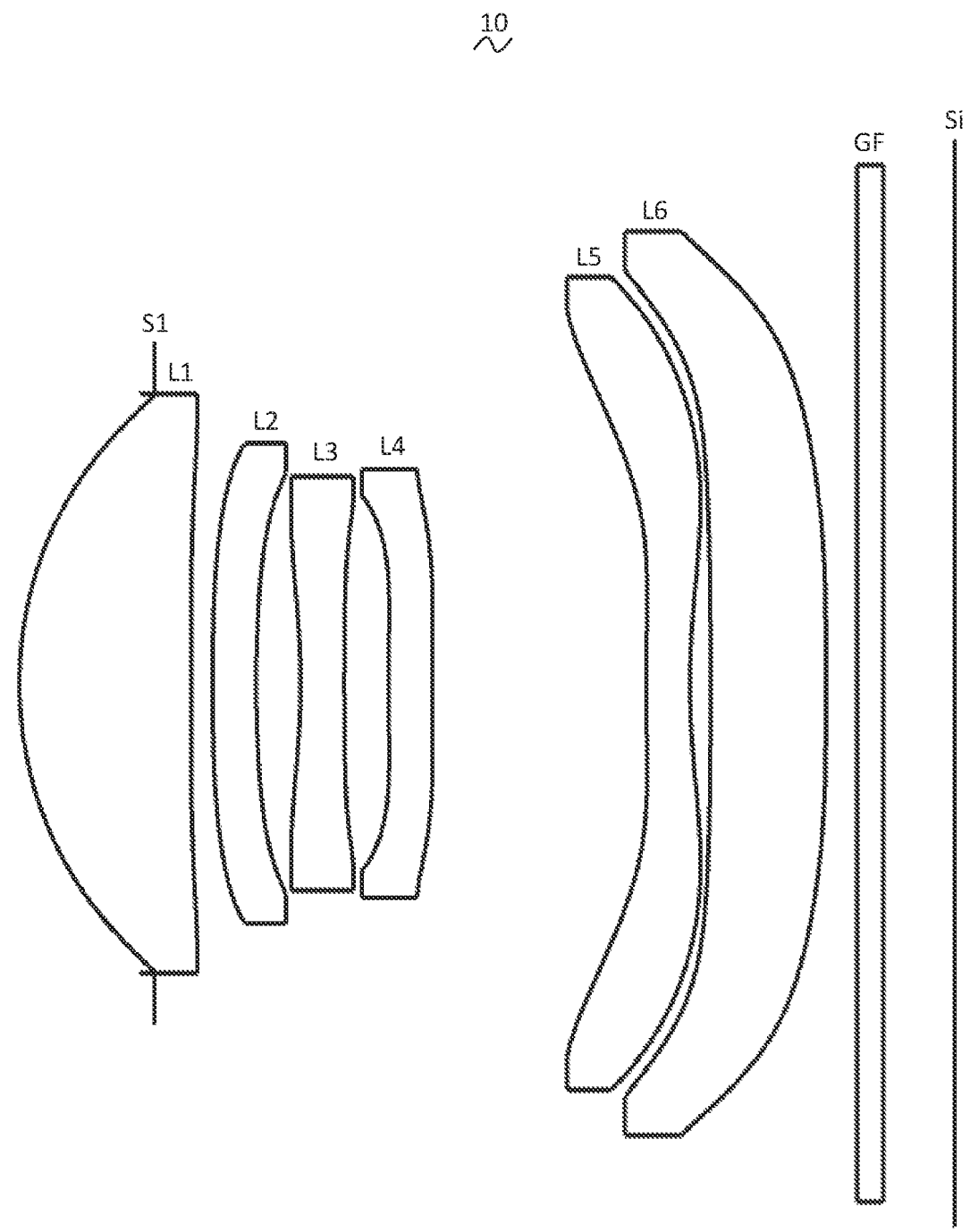
FIG. 1 is a schematic diagram of a structure of a camera optical lens according to a first embodiment of the present disclosure.

Referring to the accompanying drawings, the present disclosure provides a camera optical lens 10. FIG. 1 shows the camera optical lens 10 of the first embodiment of the present disclosure, the camera optical lens 10 includes six lenses. Specifically, the camera optical lens 10 includes, from an object side to an image side: an aperture S1, a first lens L1, a second lens L2, a third lens L3, a fourth lens L4, a fifth lens L5, and a sixth lens L6. An optical element, such as an optical filter GF, may be arranged between the sixth lens L6 and an image surface Si.

In this embodiment, the first lens L1 has a positive refractive power, the second lens L2 has a negative refractive power, the third lens L3 has a negative refractive power, the fourth lens L4 has a positive refractive power, the fifth lens L5 has a negative refractive power, and the sixth lens L6 has a negative refractive power.

In this embodiment, the first lens L1 is made of glass material, and the second lens L2, the third lens L3, the fourth lens L4, the fifth lens L5, and the sixth lens L6 are all made of plastic material. In other embodiments, the lenses may also be made of other materials.

In this embodiment, an abbe number of the first lens L1 is defined as v1, an on-axis distance from an image-side surface of the fourth lens L4 to an object-side surface of the fifth lens L5 is defined as d8, and an on-axis thickness of the fifth lens L5 is defined as d9. The camera optical lens 10 satisfies a condition of:

$$65.00 \leq v1 \leq 90.00 \quad (1)$$

$$2.00 \leq d8/d9 \leq 8.00 \quad (2)$$

Herein, the relational expression (1) specifies the abbe number of the first lens L1, conducing to improve the performance of the optical system within the range of the relational expression.

The relational expression (2) specifies a ratio between the on-axis distance d8 from the image-side surface of the fourth lens L4 to the object-side surface of the fifth lens L5 and the on-axis thickness d9 of the fifth lens L5, conducing to compress the total optical length and achieve an ultra-thin effect in this range.

A focal length of the camera optical lens 10 is defined as f, and a focal length of the fourth lens L4 is defined as f4. The camera optical lens 10 satisfies a condition of 1.50≤f4/f≤4.00, which specifies a ratio between the focal length f4 of the fourth lens L4 and the focal length f of the camera optical lens 10. In this way, the focal length is distributed appropriately, so that the camera optical lens can attain a better imaging quality and a lower sensitivity.

A central curvature radius of an object-side surface of the sixth lens L6 is defined as R11, and a central curvature radius of an image-side surface of the sixth lens L6 is defined as R12. The camera optical lens 10 satisfies a condition of R12/R11≤−1.50. The relationship expression specifies a shape of the fourth lens L4, thus facilitating correcting an off-axis aberration in this range.

In this embodiment, an object-side surface of the first lens L1 is convex in the paraxial region, and an image-side surface of the first lens L1 is convex in the paraxial region.

A focal length of the camera optical lens 10 is defined as f, and a focal length of the first lens L1 is defined as f1. The camera optical lens 10 satisfies a condition of 0.23≤f1/f≤0.84. The relationship expression specifies a ratio between the focal length f1 of the first lens L1 and the focal length f of the camera optical lens 10. Within the range specified by the relationship expression, the first lens L1 has an appropriate positive refractive power, thus facilitating reducing system aberration and a development towards a lens having a characteristics of ultra-thin and long focal length. Preferably, the camera optical lens 10 further satisfies a condition of 0.36≤f1/f≤0.68.

A central curvature radius of an object-side surface of the first lens L1 is defined as R1, and a central curvature radius of an image-side surface of the first lens L1 is defined as R2. The camera optical lens 10 satisfies a condition of −1.87≤

$(R1+R2)/(R1-R2) \le -0.46$. By reasonably controlling a shape of the first lens L1, the first lens L1 can effectively correct system spherical aberration. Preferably, the camera optical lens 10 satisfies a condition of $-1.17 \le (R1+R2)/(R1-R2) \le -0.57$.

An on-axis thickness of the first lens L1 is defined as d1, and a total optical length of the camera optical lens 10 is defined as TTL. The camera optical lens 10 satisfies a condition of $0.09 \le d1/TTL \le 0.30$, conducing to realize an ultra-thin effect in this range. Preferably, the camera optical lens 10 further satisfies a condition of $0.15 \le d1/TTL \le 0.24$.

In this embodiment, an object-side surface of the second lens L2 is convex in the paraxial region, and an image-side surface of the second lens L2 is concave in the paraxial region.

The focal length of the camera optical lens 10 is defined as f, and a focal length of the second lens L2 is defined as f2. The camera optical lens 10 satisfies a condition of $-7.78 \le f2/f \le -1.79$. In this way, the positive refractive power of the second lens L2 is controlled within a reasonable range, so that it is beneficial to correct an aberration of the optical system. Preferably, the camera optical lens 10 further satisfies a condition of $-4.86 \le f2/f \le -2.23$.

A central curvature radius of the object-side surface of the second lens L2 is defined as R3, a central curvature radius of the image-side surface of the second lens L2 is defined as R4, and the camera optical lens 10 further satisfies a condition of $-2.02 \le (R3+R4)/(R3-R4) \le 4.85$, which specifies a shape of the second lens L2. Within this range, a development towards ultra-thin and wide-angle lenses would facilitate correcting the problem of an on-axis aberration. Preferably, the camera optical lens 10 further satisfies a condition of $-1.26 \le (R3+R4)/(R3-R4) \le 3.88$.

A total optical length of the camera optical lens 10 is defined as TTL, an on-axis thickness of the second lens L2 is defined as d3, and the camera optical lens 10 satisfies a condition of $0.02 \le d3/TTL \le 0.07$. Within this range, it is beneficial to achieve ultra-thin lenses. Preferably, the camera optical lens 10 further satisfies a condition of $0.04 \le d3/TTL \le 0.06$.

In an embodiment, an object-side surface of the third lens L3 is concave in the paraxial region, and an image-side surface of the third lens L3 is concave in the paraxial region.

The focal length of the camera optical lens 10 is defined as f, a focal length of the third lens L3 is defined as f3, and the camera optical lens 10 further satisfies a condition of $-1.59 \le f3/f \le -0.39$. In this way, a negative refractive power of the third lens L3 is distributed appropriately, so that the camera optical lens can attain a better imaging quality and a lower sensitivity. Preferably, the camera optical lens 10 further satisfies a condition of $-0.99 \le f3/f \le -0.48$.

A central curvature radius of the object-side surface of the third lens L3 is defined as R5, a central curvature radius of the image-side surface of the third lens L3 is defined as R6, and the camera optical lens 10 further satisfies a condition of $-1.45 \le (R5+R6)/(R5-R6) \le -0.36$, which specifies a shape of the third lens L3. Within this range, the deflection of light passing through the lens can be eased and aberrations can be effectively reduced. Preferably, the camera optical lens 10 further satisfies a condition of $-0.90 \le (R5+R6)/(R5-R6) \le -0.45$.

The total length of the camera optical lens 10 is defined as TTL, an on-axis thickness of the third lens L3 is defined as d5, and the camera optical lens 10 further satisfies a condition of $0.02 \le d5/TTL \le 0.07$. This can facilitate achieving ultra-thin lenses. Preferably, the camera optical lens 10 further satisfies a condition of $0.03 \le d5/TTL \le 0.06$.

In an embodiment, an object-side surface of the fourth lens L4 is convex in the paraxial region, and an image-side surface of the fourth lens L4 is concave in the paraxial region.

A curvature radius of the object-side surface of the fourth lens L4 is defined as R7, a curvature radius of the image-side surface of the fourth lens L4 is defined as R8, and the camera optical lens 10 satisfies a condition of $-7.93 \le (R7+R8)/(R7-R8) \le -1.42$ which specifies a shape of the fourth lens L4. Within this range, a development towards ultra-thin lenses would facilitate correcting the problem of the off-axis aberration. Preferably, the camera optical lens 10 further satisfies a condition of $-4.96 \le (R7+R8)/(R7-R8) \le -1.78$.

The total optical length of the camera optical lens 10 is defined as TTL, an on-axis thickness of the fourth lens L4 is defined as d7, and the camera optical lens 10 satisfies a condition of $0.02 \le d7/TTL \le 0.07$. Within this range, this can facilitate achieving ultra-thin lenses. Preferably, the camera optical lens 10 further satisfies a condition of $0.03 \le d7/TTL \le 0.06$.

In an embodiment, an object-side surface of the fifth lens L5 is convex in the paraxial region, and an image-side surface of the fifth lens L5 is concave in the paraxial region.

The focal length of the camera optical lens 10 is defined as f, a focal length of the fifth lens L5 is defined as f5, and the camera optical lens 10 further satisfies a condition of $-3.02 \le f5/f \le -0.94$, which can effectively make a light angle of the camera optical lens 10 gentle and reduce a tolerance sensitivity. Preferably, the camera optical lens 10 further satisfies a condition of $-1.89 \le f5/f \le -1.17$.

A central curvature radius of the object-side surface of the fifth lens L5 is defined as R9, a central curvature radius of the image-side surface of the fifth lens L5 is defined as R10, and the camera optical lens 10 further satisfies a condition of $0.85 \le (R9+R10)/(R9-R10) \le 2.96$, which specifies a shape of the fifth lens L5. Within this range, a development towards ultra-thin and wide-angle lenses can facilitate correcting a problem of the off-axis aberration. Preferably, the camera optical lens 10 further satisfies a condition of $1.36 \le (R9+R10)/(R9-R10) \le 2.37$.

The total optical length of the camera optical lens 10 is defined as TTL, an on-axis thickness of the fifth lens L5 is defined as d9, and the camera optical lens 10 further satisfies a condition of $0.02 \le d9/TTL \le 0.10$. Within this range, this can facilitate achieving ultra-thin lenses. Preferably, the camera optical lens 10 further satisfies a condition of $0.03 \le d9/TTL \le 0.08$.

In this embodiment, an object-side surface of the sixth lens L6 is concave in the paraxial region, and an image-side surface of the sixth lens L6 is concave in the paraxial region. It can be understood that, in other embodiments, for the first lens L1, the second lens L2, the third lens L3, the fourth lens L4, the fifth lens L5, and the sixth lens L6, surface profiles of an object-side surface and an image-side surface respectively may be configured in other convex or concave arrangement.

A focal length of the camera optical lens 10 is defined as f, a focal length of the sixth lens L6 is defined as f6, and the camera optical lens satisfies a condition of $-124.82 \le f6/f \le 82.03$. In this way, the focal length of the sixth lens L6 is distributed appropriately, so that the system can attain a better imaging quality and a lower sensitivity. Preferably, the camera optical lens 10 further satisfies a condition of $-78.01 \le f6/f \le 65.63$.

A central curvature radius of the object-side surface of the sixth lens L6 is defined as R11, a central curvature radius of the image-side surface of the sixth lens L6 is defined as R12, and the camera optical lens 10 further satisfies a condition of $-1.77 \leq (R11+R12)/(R11-R12) \leq -0.14$, which specifies a shape of the sixth lens L6. Within this range, a development towards ultra-thin lenses would facilitate correcting a problem like the off-axis aberration. Preferably, the camera optical lens 10 further satisfies a condition of $-1.11 \leq (R11+R12)/(R11-R12) \leq -0.17$.

The total optical length of the camera optical lens 10 is defined as TTL, an on-axis thickness of the sixth lens L6 is defined as d11, and the camera optical lens 10 further satisfies a condition of $0.05 \leq d11/TTL \leq 0.20$. Within this range, this can facilitate achieving ultra-thin lenses. Preferably, the camera optical lens 10 further satisfies a condition of $0.08 \leq d11/TTL \leq 0.16$.

In this embodiment, an image height of the camera optical lens 10 is defined as IH, the total optical length of the camera optical lens 10 is defined as TTL, and the camera optical lens 10 further satisfies a condition of $TTL/IH \leq 2.15$, thus facilitating to achieve ultra-thin lenses.

In this embodiment, an F number (FNO) of the camera optical lens 10 is less than or equal to 2.00, thus achieving a wide aperture and the camera optical lens has excellent imaging performance.

In this embodiment, the focal length of the camera optical lens 10 is defined as f, the image height of the camera optical lens 10 is defined as IH, and the camera optical lens 10 further satisfies a condition of $f/IH \geq 2.20$, thus achieving a long focal length and the camera optical lens has excellent imaging performance.

In this embodiment, the focal length of the camera optical lens 10 is defined as f, a combined focal length of the first lens L1 and the second lens L2 is defined as f12, and the camera optical lens 10 further satisfies a condition of $0.26 \leq f12/f \leq 0.92$. Within this range, the aberration and distortion of the imaging optical lens 10 can be eliminated, and the focal length of the imaging optical lens 10 can be suppressed to maintain the miniaturization of the imaging lens system group. Preferably, the camera optical lens 10 further satisfies a condition of $0.41 \leq f12/f \leq 0.74$.

When the above condition is satisfied, the camera optical lens 10 can meet the design requirements of wide-angle and ultra-thin in the case that a good optical performance is maintained. According to characteristics of the camera optical lens 10, the camera optical lens 10 is particularly suitable for mobile phone camera lens components and WEB camera lenses composed of camera elements such as CCD and CMOS with high pixel.

In the following, examples will be used to describe the camera optical lens 10 of the present disclosure. The symbols recorded in each example will be described as follows. The focal length, on-axis distance, central curvature radius, on-axis thickness, inflexion point position, and arrest point position are all in units of mm.

TTL refers to a total optical length (an on-axis distance from an object-side surface of the first lens L1 to an image surface Si) in units of mm.

Aperture value FNO refers to a ratio of an effective focal length of the camera optical lens to an entrance pupil diameter.

Preferably, inflexion points and/or arrest points can be arranged on the object-side surface and/or the image-side surface of the lens, so as to satisfy the demand for high quality imaging. The description below may be referred for specific implementations.

The design data of the camera optical lens 10 in the first embodiment of the present disclosure are shown in Table 1.

TABLE 1

|  | R | d | nd | | vd | |
|---|---|---|---|---|---|---|
| S1 | ∞ | d0 = −1.082 | | | | |
| R1 | 2.197 | d1 = 1.375 | nd1 | 1.5267 | v1 | 76.60 |
| R2 | −61.236 | d2 = 0.173 | | | | |
| R3 | 18.237 | d3 = 0.350 | nd2 | 1.5661 | v2 | 37.71 |
| R4 | 7.812 | d4 = 0.354 | | | | |
| R5 | −4.545 | d5 = 0.350 | nd3 | 1.6153 | v3 | 25.94 |
| R6 | 27.488 | d6 = 0.355 | | | | |
| R7 | 8.692 | d7 = 0.350 | nd4 | 1.6700 | v4 | 19.39 |
| R8 | 14.552 | d8 = 1.715 | | | | |
| R9 | 13.150 | d9 = 0.350 | nd5 | 1.5444 | v5 | 55.82 |
| R10 | 4.311 | d10 = 0.164 | | | | |
| R11 | −399.766 | d11 = 0.924 | nd6 | 1.6701 | v6 | 19.39 |
| R12 | 1998.828 | d12 = 0.250 | | | | |
| R13 | ∞ | d13 = 0.210 | ndg | 1.5168 | vg | 64.17 |
| R14 | ∞ | d14 = 0.570 | | | | |

In the table, meanings of various symbols will be described as follows:

S1: aperture;
R: curvature radius at a center of an optical surface;
R1: central curvature radius of the object-side surface of the first lens L1;
R2: central curvature radius of the image-side surface of the first lens L1;
R3: central curvature radius of the object-side surface of the second lens L2;
R4: central curvature radius of the image-side surface of the second lens L2;
R5: central curvature radius of the object-side surface of the third lens L3;
R6: central curvature radius of the image-side surface of the third lens L3;
R7: central curvature radius of the object-side surface of the fourth lens L4;
R8: central curvature radius of the image-side surface of the fourth lens L4;
R9: central curvature radius of the object-side surface of the fifth lens L5;
R10: central curvature radius of the image-side surface of the fifth lens L5;
R11: central curvature radius of the object-side surface of the sixth lens L6;
R12: central curvature radius of the image-side surface of the sixth lens L6;
R13: central curvature radius of an object-side surface of the optical filter GF;
R14: central curvature radius of an image-side surface of the optical filter GF;
d: on-axis thickness of a lens, or an on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;

d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the optical filter GF;
d13: on-axis thickness of the optical filter GF;
d14: on-axis distance from the image-side surface of the optical filter GF to the image surface Si;
nd: refractive index of a d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows aspherical surface data of the camera optical lens 10 in the first embodiment of the present disclosure.

Here, K is a conic coefficient, and A4, A6, A8, A10, A12, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (3)$$

Here, x denotes a vertical distance between a point on an aspheric curve and an optical axis, and y denotes a depth of a aspheric surface (i.e. a vertical distance between a point on an aspheric surface that is x away from the optical axis, and a tangent plane tangent to an vertex of the optical axis on the aspheric surface).

For convenience, an aspheric surface of each lens surface uses the aspheric surfaces shown in the above formula (3). However, the present disclosure is not limited to the aspherical polynomials form shown in the formula (3).

Table 3 and Table 4 show design data of inflexion points and arrest points of the camera optical lens 10 according to the first embodiment of the present disclosure. P1R1 and P1R2 respectively represent the object-side surface and the image-side surface of the first lens L1, P2R1 and P2R2 respectively represent the object-side surface and the image-side surface of the second lens L2, P3R1 and P3R2 respectively represent the object-side surface and the image-side surface of the third lens L3, P4R1 and P4R2 respectively represent the object-side surface and the image-side surface of the fourth lens L4, P5R1 and P5R2 respectively represent the object-side surface and the image-side surface of the fifth lens L5, P6R1 and P6R2 respectively represent the object-side surface and the image-side surface of the sixth lens L6. The data in the column named "inflexion point position" refer to vertical distances from inflexion points arranged on each lens surface to the optic axis of the camera optical lens 10. The data in the column named "arrest point position"

TABLE 2

| | Conic coefficient | Aspheric surface coefficients | | | | |
|---|---|---|---|---|---|---|
| | k | A4 | A6 | A8 | A10 | A12 |
| R1 | 0.0000E+00 | −1.3824E−03 | −4.3037E−05 | −5.9113E−04 | 6.3428E−04 | −4.6174E−04 |
| R2 | −8.2275E+01 | 2.5553E−02 | −1.1368E−02 | 3.4591E−03 | −9.2105E−04 | 1.8015E−04 |
| R3 | 9.8772E+01 | 3.0214E−02 | −1.3468E−02 | 8.1355E−03 | −6.1065E−03 | 4.9426E−03 |
| R4 | 6.2008E+00 | −1.2030E−03 | 8.4432E−03 | 1.7108E−02 | −3.7157E−02 | 4.3949E−02 |
| R5 | 7.2963E+00 | 1.7335E−02 | 9.1448E−02 | −1.1679E−01 | 1.1127E−01 | −7.8477E−02 |
| R6 | −7.9723E+01 | −2.6113E−02 | 1.2752E−01 | −1.6961E−01 | 1.8511E−01 | −1.6929E−01 |
| R7 | 3.1201E+01 | −1.4171E−01 | 4.1188E−02 | −5.2585E−03 | −4.6289E−02 | 7.4809E−02 |
| R8 | 6.0407E+01 | −8.6024E−02 | 1.0792E−02 | 3.7385E−02 | −7.5941E−02 | 8.0556E−02 |
| R9 | −3.1211E+01 | −4.6344E−02 | −1.4698E−02 | 1.0627E−02 | −2.0874E−03 | 6.7628E−05 |
| R10 | 8.4386E−02 | −3.4928E−02 | −1.5135E−02 | 1.1961E−02 | −4.3086E−03 | 9.2589E−04 |
| R11 | −9.9000E+01 | −1.5376E−02 | 8.3430E−03 | −2.7719E−03 | 3.7979E−04 | −2.5947E−05 |
| R12 | 9.9000E+01 | −3.2157E−02 | 6.8847E−03 | 2.0883E−04 | −4.7848E−04 | 1.0210E−04 |

| | Conic coefficient | Aspheric surface coefficients | | | |
|---|---|---|---|---|---|
| | k | A14 | A16 | A18 | A20 |
| R1 | 0.0000E+00 | 1.8475E−04 | −4.3677E−05 | 5.4201E−06 | −3.1431E−07 |
| R2 | −8.2275E+01 | −2.1438E−05 | 1.4414E−06 | −5.0423E−08 | 7.1542E−10 |
| R3 | 9.8772E+01 | −2.6489E−03 | 8.3916E−04 | −1.3722E−04 | 8.8778E−06 |
| R4 | 6.2008E+00 | −2.8529E−02 | 9.5704E−03 | −1.1980E−03 | −5.3831E−05 |
| R5 | 7.2963E+00 | 3.8089E−02 | −1.1483E−02 | 1.8495E−03 | −1.1794E−04 |
| R6 | −7.9723E+01 | 1.0991E−01 | −4.5289E−02 | 1.0175E−02 | −9.2742E−04 |
| R7 | 3.1201E+01 | −7.1839E−02 | 4.3567E−02 | −1.5575E−02 | 2.4317E−03 |
| R8 | 6.0407E+01 | −5.0884E−02 | 1.9087E−02 | −3.8181E−03 | 3.0835E−04 |
| R9 | −3.1211E+01 | 3.6076E−05 | −5.9427E−06 | 3.7240E−07 | −8.5853E−09 |
| R10 | 8.4386E−02 | −1.2172E−04 | 9.4443E−06 | −3.9250E−07 | 6.6942E−09 |
| R11 | −9.9000E+01 | 9.8146E−07 | −2.1010E−08 | 2.3920E−10 | −1.1291E−12 |
| R12 | 9.9000E+01 | −1.0021E−05 | 4.2509E−07 | 5.2384E−10 | −4.0749E−10 | refer to vertical distances from arrest points arranged on each lens surface to the optical axis of the camera optical lens 10.

TABLE 3

| | Number(s) of inflexion points | Inflexion point position 1 | Inflexion point position 2 |
|---|---|---|---|
| P1R1 | 1 | 1.955 | / |
| P1R2 | 2 | 0.245 | 1.455 |
| P2R1 | 0 | / | / |
| P2R2 | 1 | 1.375 | / |
| P3R1 | 2 | 0.645 | 1.295 |
| P3R2 | 1 | 1.115 | / |
| P4R1 | 1 | 0.275 | / |
| P4R2 | 2 | 0.275 | 1.255 |
| P5R1 | 2 | 0.355 | 1.975 |
| P5R2 | 1 | 0.685 | / |
| P6R1 | 1 | 2.775 | / |
| P6R2 | 2 | 0.045 | 2.955 |

TABLE 4

| | Number(s) of arrest points | Arrest point position 1 | Arrest point position 2 |
|---|---|---|---|
| P1R1 | 0 | / | / |
| P1R2 | 1 | 0.425 | / |
| P2R1 | 0 | / | / |
| P2R2 | 0 | / | / |
| P3R1 | 2 | 1.155 | 1.365 |
| P3R2 | 0 | / | / |
| P4R1 | 1 | 0.485 | / |
| P4R2 | 1 | 0.475 | / |
| P5R1 | 1 | 0.595 | / |
| P5R2 | 1 | 1.225 | / |
| P6R1 | 0 | / | / |
| P6R2 | 1 | 0.065 | / |

Figure 2:
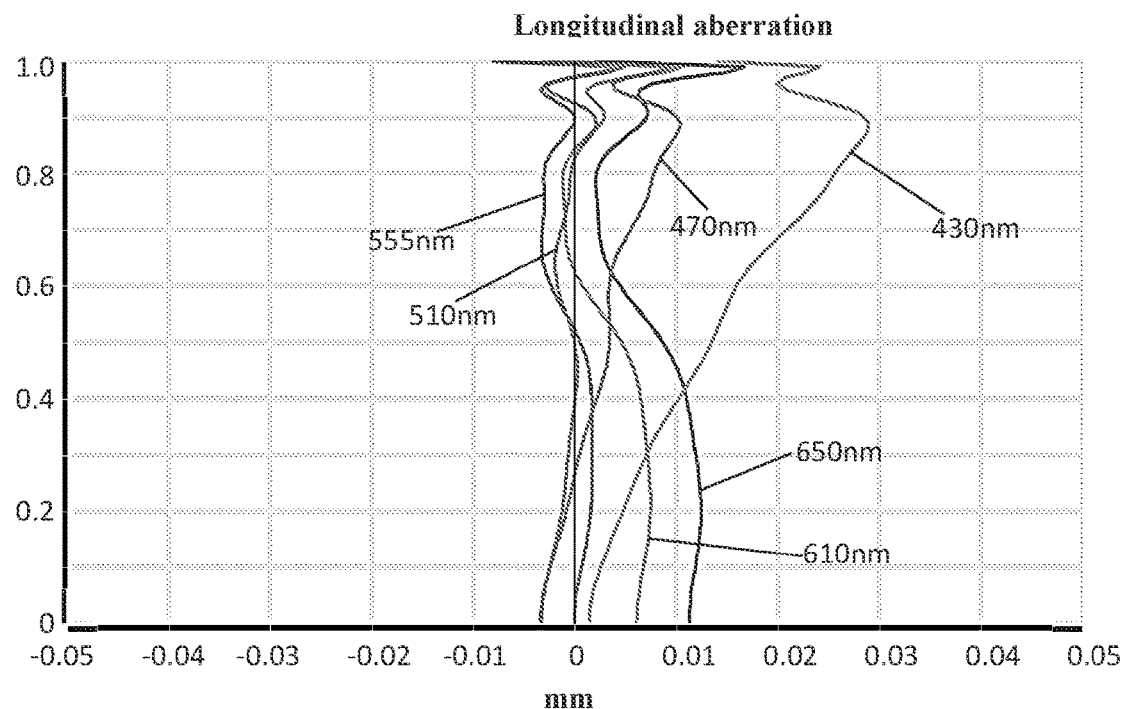
FIG. 2 is a schematic diagram of a longitudinal aberration of the camera optical lens shown in FIG. 1.
Figure 3:
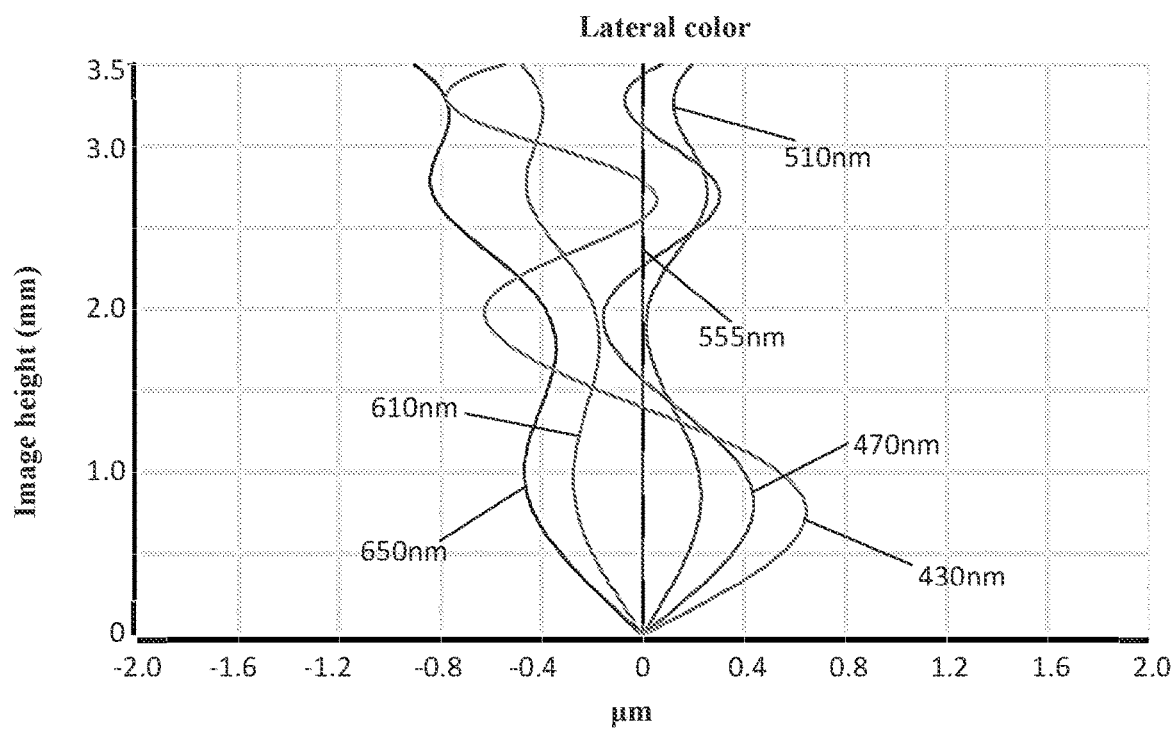
FIG. 3 is a schematic diagram of a lateral color of the camera optical lens shown in FIG. 1.
Figure 4:
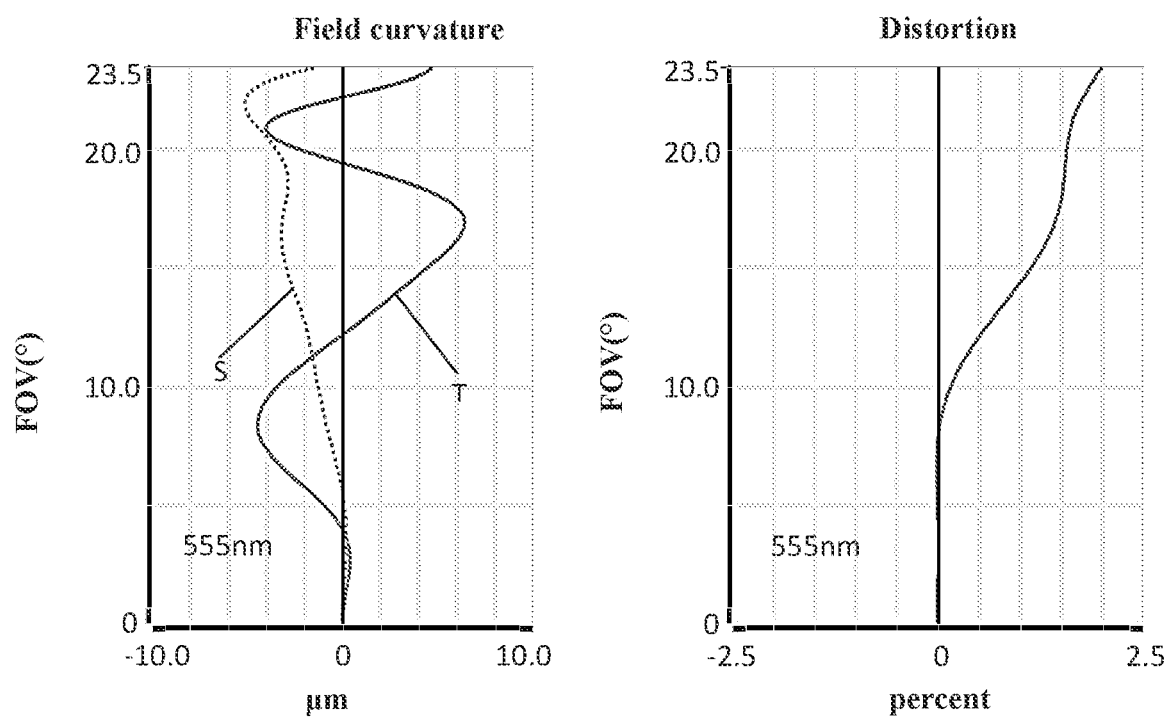
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 430 nm, 470 nm, 510 nm, 555 nm, 610 nm and 650 nm after passing the camera optical lens 10 according to the first embodiment, respectively. FIG. 4 illustrates a field curvature and a distortion of light with a wavelength of 555 nm after passing the camera optical lens 10 according to the first embodiment. In FIG. 4, a field curvature S is a field curvature in a sagittal direction, and T is a field curvature in a meridional direction.

Table 13 in the following shows various values of first, second and third embodiments and values corresponding to parameters which are specified in the above conditions.

As shown in Table 13, the first embodiment satisfies the above conditions.

In this Embodiment, an entrance pupil diameter (ENPD) of the camera optical lens is 3.946 mm, an image height (IH) of 1.0H is 3.500 mm, a field of view (FOV) in a diagonal direction is 47.00°. Thus, the camera optical lens meets the design requirements of large aperture, long focal length and ultra-thin. Its on-axis and off-axis aberrations are fully corrected, thereby achieving excellent optical characteristics.

Second Embodiment

Figure 5:
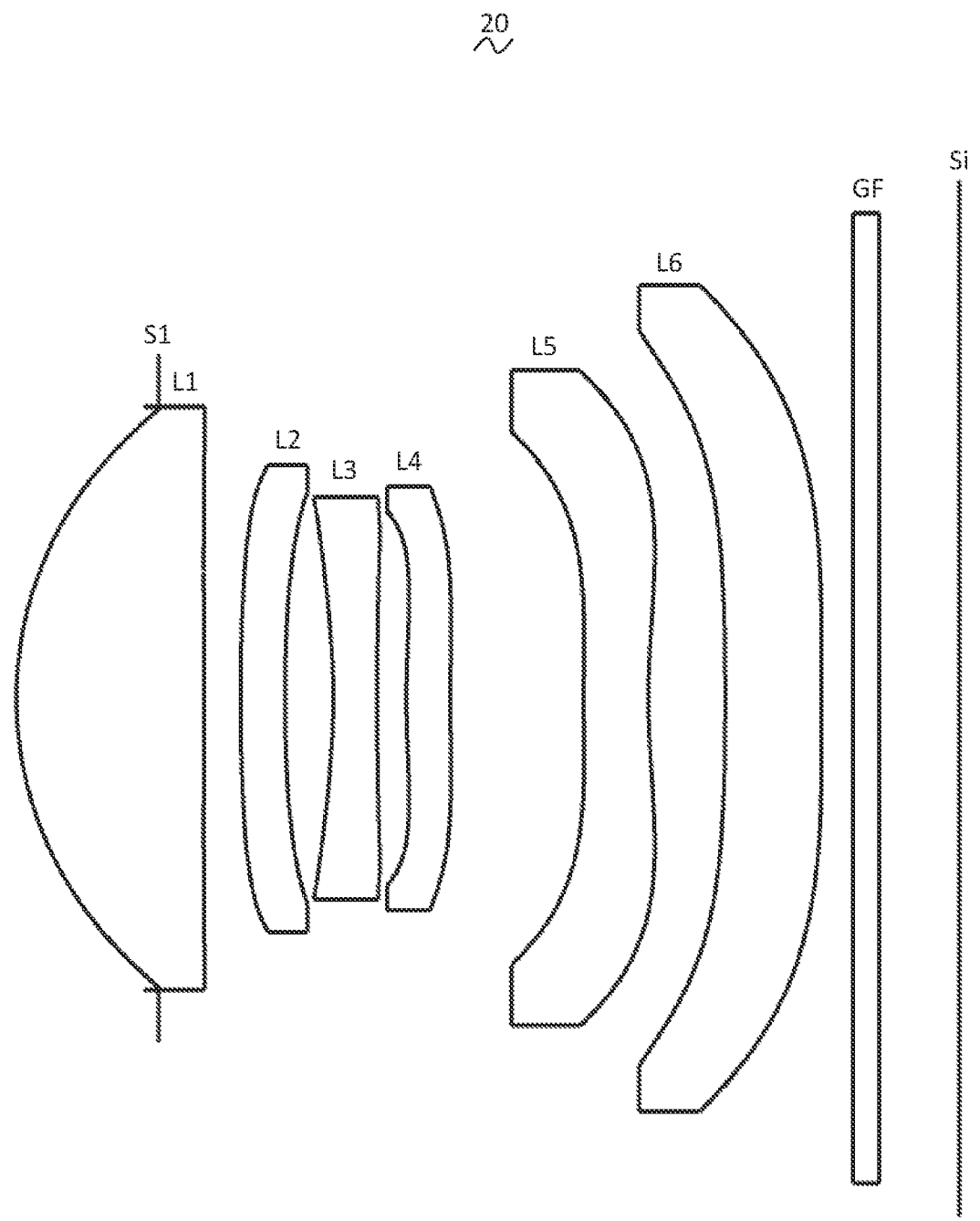
FIG. 5 is a schematic diagram of a structure of a camera optical lens according to a second embodiment of the present disclosure.

FIG. 5 shows a camera optical lens 20 of the second embodiment of the present disclosure, the second embodiment is basically the same as the first embodiment and involves symbols having the same meanings as the first embodiment, and only differences therebetween will be described in the following.

Table 5 shows design data of the camera optical lens 20 in the second embodiment of the present disclosure.

TABLE 5

| | R | d | | nd | | vd |
|---|---|---|---|---|---|---|
| S1 | ∞ | d0 = −1.127 | | | | |
| R1 | 2.084 | d1 = 1.491 | nd1 | 1.4560 | v1 | 89.60 |
| R2 | −60.230 | d2 = 0.291 | | | | |
| R3 | 15.381 | d3 = 0.350 | nd2 | 1.5661 | v2 | 37.71 |
| R4 | 8.110 | d4 = 0.384 | | | | |
| R5 | −4.750 | d5 = 0.350 | nd3 | 1.6153 | v3 | 25.94 |
| R6 | 15.752 | d6 = 0.232 | | | | |
| R7 | 5.224 | d7 = 0.350 | nd4 | 1.6700 | v4 | 19.39 |
| R8 | 14.453 | d8 = 1.058 | | | | |
| R9 | 16.981 | d9 = 0.516 | nd5 | 1.5444 | v5 | 55.82 |
| R10 | 4.415 | d10 = 0.610 | | | | |
| R11 | −29.803 | d11 = 0.768 | nd6 | 1.6701 | v6 | 19.39 |
| R12 | 500.000 | d12 = 0.250 | | | | |
| R13 | ∞ | d13 = 0.210 | ndg | 1.5168 | vg | 64.17 |
| R14 | ∞ | d14 = 0.631 | | | | |

Table 6 shows aspherical surface data of each lens of the camera optical lens 20 in the second embodiment of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −1.0887E−01 | −1.2880E−03 | −1.1845E−03 | 1.2073E−03 | −1.0278E−03 | 4.4037E−04 |
| R2 | 9.9000E+01 | 6.1832E−03 | 4.2045E−04 | −1.5440E−03 | 6.3924E−04 | −1.3303E−04 |
| R3 | 8.4037E+01 | 1.0405E−03 | 1.4144E−02 | −1.3358E−02 | 7.6384E−03 | −2.1581E−03 |
| R4 | −4.9811E+00 | −5.3231E−03 | 2.8197E−02 | −1.9830E−02 | 8.6601E−03 | −5.3161E−03 |
| R5 | 7.5474E+00 | 3.6571E−05 | 8.5911E−02 | −1.1804E−01 | 9.8614E−02 | −5.7119E−02 |
| R6 | −9.9000E+01 | −6.7009E−02 | 1.7197E−01 | −2.4440E−01 | 2.4854E−01 | −1.9897E−01 |
| R7 | 6.8198E+00 | −1.4053E−01 | 7.8331E−02 | −5.4199E−02 | −2.5400E−02 | 7.8942E−02 |
| R8 | −2.0122E+01 | −7.0364E−02 | 1.3991E−02 | 2.0274E−02 | −5.8424E−02 | 6.2430E−02 |
| R9 | 7.8235E+01 | −8.9104E−02 | 1.4776E−02 | −4.3026E−03 | 1.1123E−03 | −3.6503E−04 |
| R10 | 2.3601E+00 | −8.1733E−02 | 2.0405E−02 | −8.3990E−03 | 2.7542E−03 | −7.4010E−04 |
| R11 | −9.9000E+01 | −2.3846E−02 | 7.3174E−03 | −2.8957E−03 | 5.2104E−04 | −4.4641E−05 |
| R12 | 9.9000E+01 | −3.0181E−02 | 6.9287E−03 | −2.0223E−03 | 4.1934E−04 | −6.3188E−05 |

TABLE 6-continued

| | Conic coefficient | Aspheric surface coefficients | | | |
|---|---|---|---|---|---|
| | k | A14 | A16 | A18 | A20 |
| R1 | −1.0887E−01 | −1.0488E−04 | 8.9514E−06 | 6.9591E−07 | −1.6593E−07 |
| R2 | 9.9000E+01 | 1.5870E−05 | −1.0867E−06 | 3.9463E−08 | −5.8696E−10 |
| R3 | 8.4037E+01 | 1.2834E−04 | 1.5570E−04 | −4.8272E−05 | 4.2760E−06 |
| R4 | −4.9811E+00 | 7.8896E−03 | −6.8862E−03 | 2.9598E−03 | −5.0609E−04 |
| R5 | 7.5474E+00 | 2.3499E−02 | −6.3091E−03 | 9.3501E−04 | −5.5658E−05 |
| R6 | −9.9000E+01 | 1.1579E−01 | −4.4123E−02 | 9.4206E−03 | −8.3144E−04 |
| R7 | 6.8198E+00 | −8.5239E−02 | 5.1813E−02 | −1.7825E−02 | 2.6908E−03 |
| R8 | −2.0122E+01 | −3.8754E−02 | 1.4375E−02 | −2.8270E−03 | 2.2226E−04 |
| R9 | 7.8235E+01 | 8.7628E−05 | −1.0912E−05 | 6.5478E−07 | −1.5202E−08 |
| R10 | 2.3601E+00 | 1.4450E−04 | −1.8221E−05 | 1.2716E−06 | −3.6250E−08 |
| R11 | −9.9000E+01 | 2.0502E−06 | −5.2250E−08 | 6.9966E−10 | −3.8550E−12 |
| R12 | 9.9000E+01 | 7.1077E−06 | −5.7312E−07 | 2.8927E−08 | −6.5194E−10 |

Table 7 and table 8 show design data of inflexion points and arrest points of each lens of the camera optical lens 20 lens according to the second embodiment of the present disclosure.

TABLE 7

| | Number(s) of inflexion points | Inflexion point position 1 | Inflexion point position 2 |
|---|---|---|---|
| P1R1 | 0 | / | / |
| P1R2 | 2 | 0.485 | 1.445 |
| P2R1 | 0 | / | / |
| P2R2 | 1 | 1.375 | / |
| P3R1 | 0 | / | / |
| P3R2 | 1 | 0.895 | / |
| P4R1 | 1 | 0.385 | / |
| P4R2 | 2 | 0.295 | 1.365 |
| P5R1 | 2 | 0.245 | 1.825 |
| P5R2 | 2 | 0.545 | 2.235 |
| P6R1 | 1 | 2.375 | / |
| P6R2 | 1 | 0.075 | / |

TABLE 8

| | Number of arrest points | Arrest point position 1 |
|---|---|---|
| P1R1 | 0 | / |
| P1R2 | 1 | 0.875 |
| P2R1 | 0 | / |
| P2R2 | 0 | / |
| P3R1 | 0 | / |
| P3R2 | 1 | 1.105 |
| P4R1 | 1 | 0.685 |
| P4R2 | 1 | 0.515 |
| P5R1 | 1 | 0.425 |
| P5R2 | 1 | 0.995 |
| P6R1 | 0 | / |
| P6R2 | 1 | 0.125 |

Figure 6:
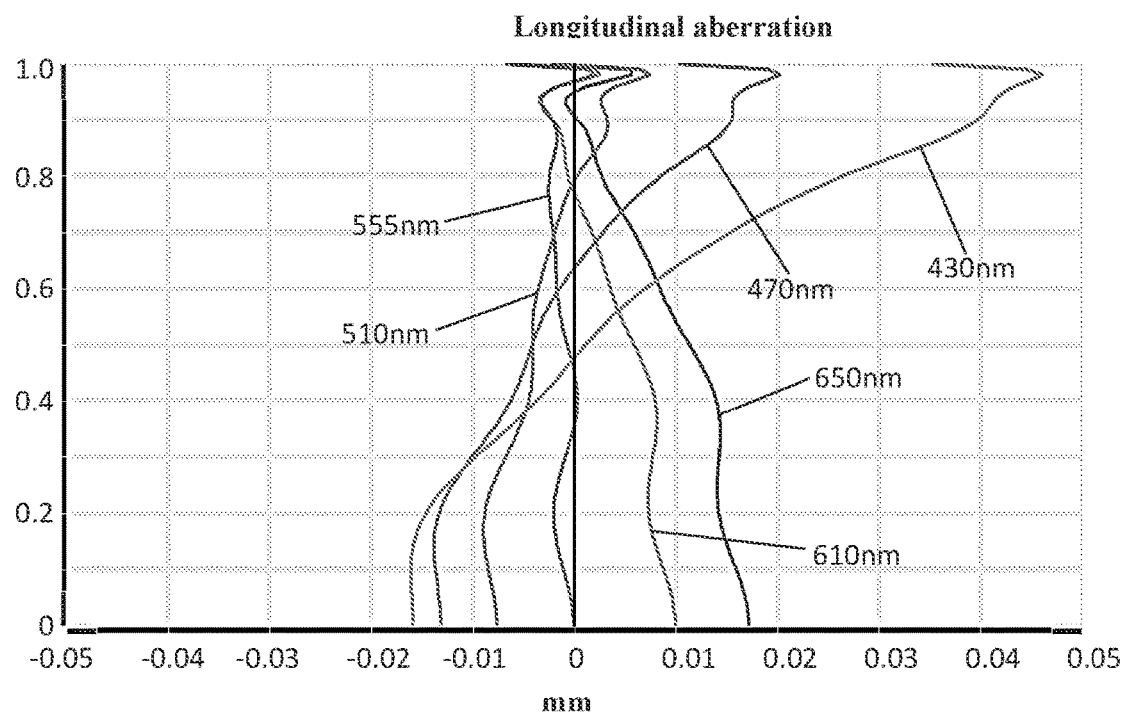
FIG. 6 is a schematic diagram of a longitudinal aberration of the camera optical lens shown in FIG. 5.
Figure 7:
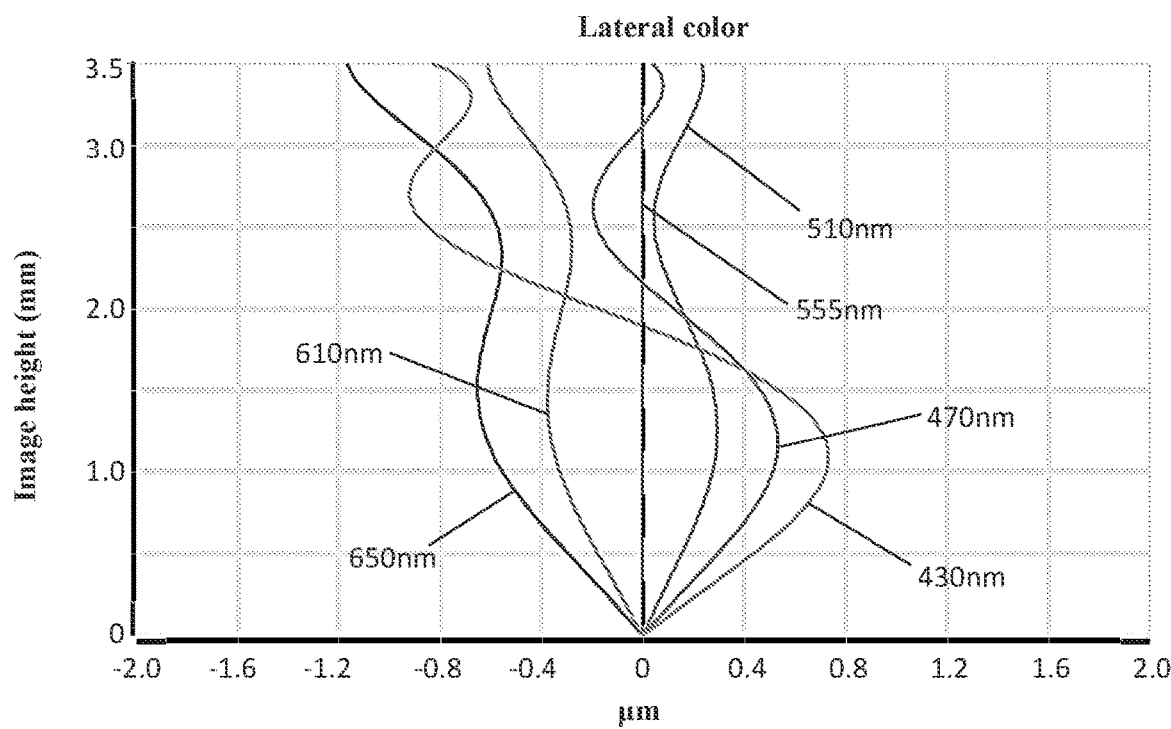
FIG. 7 is a schematic diagram of a lateral color of the camera optical lens shown in FIG. 5.
Figure 8:
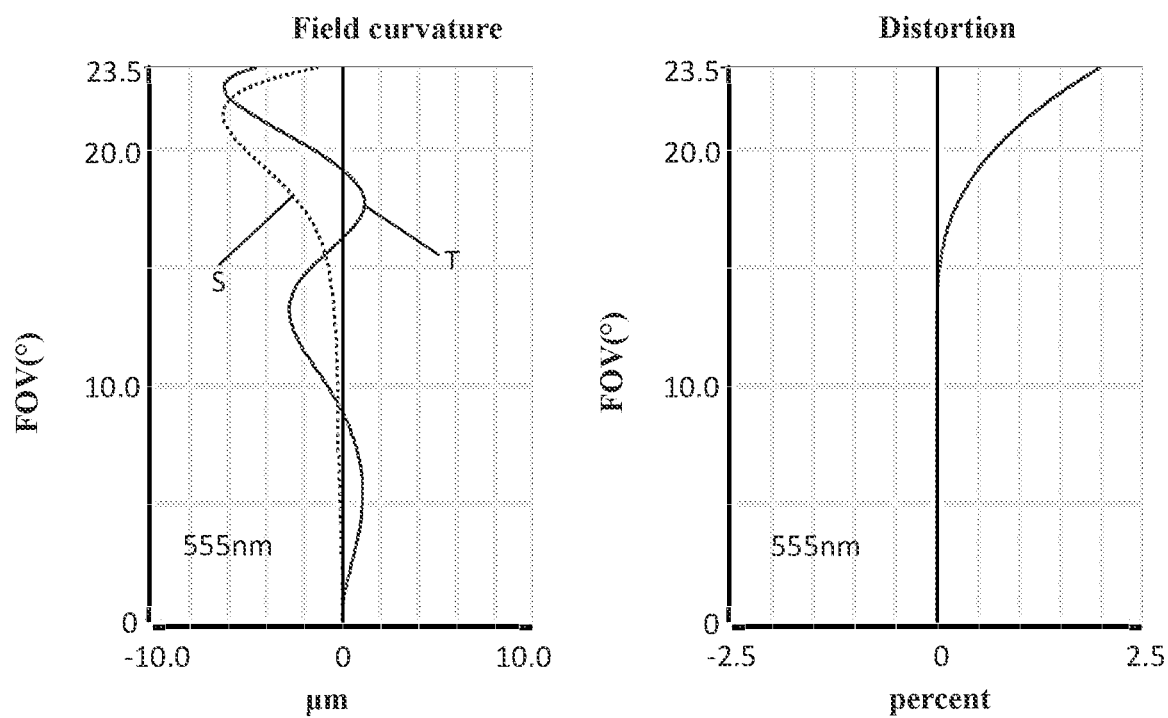
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 430 nm, 470 nm, 510 nm, 555 nm, 610 nm and 650 nm after passing the camera optical lens 20 according to the second embodiment, respectively. FIG. 8 illustrates a field curvature and a distortion of light with a wavelength of 555 nm after passing the camera optical lens 20 according to the second embodiment. In FIG. 8, a field curvature S is a field curvature in a sagittal direction, and T is a field curvature in a meridional direction.

As shown in Table 13, the second embodiment satisfies the above conditions.

In this Embodiment, an entrance pupil diameter (ENPD) of the camera optical lens 20 is 3.946 mm, an image height (IH) of 1.0H is 3.500 mm, a field of view (FOV) in a diagonal direction is 47.00°. Thus, the camera optical lens 20 meets the design requirements of large aperture, long focal length and ultra-thin. Its on-axis and off-axis aberrations are fully corrected, thereby achieving excellent optical characteristics.

Third Embodiment

Figure 9:
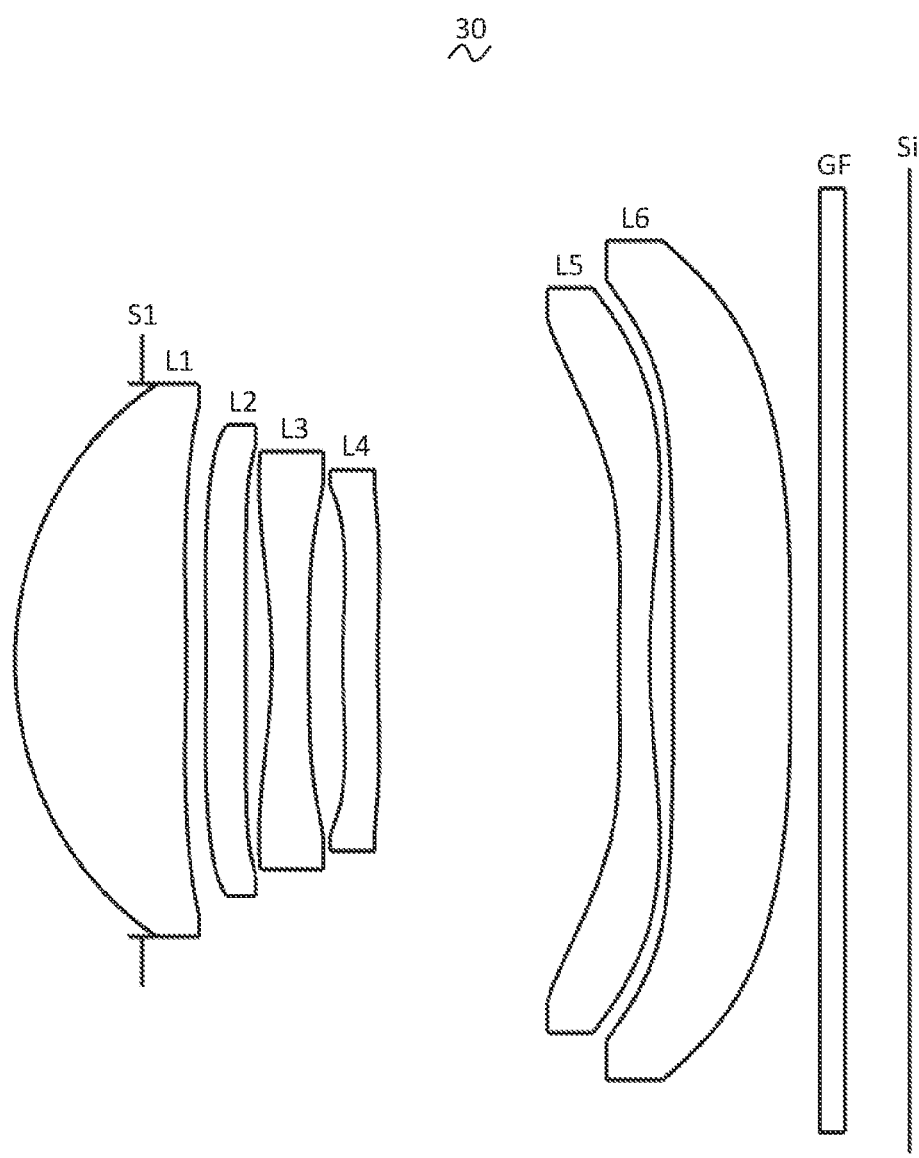
FIG. 9 is a schematic diagram of a structure of a camera optical lens according to a third embodiment of the present disclosure.

FIG. 9 shows a camera optical lens 30 of the third embodiment of the present disclosure, the third embodiment is basically the same as the first embodiment and involves symbols having the same meanings as the first embodiment, and only differences therebetween will be described in the following.

In this embodiment, the object-side surface of the second lens L2 is concave in the paraxial region, and the image-side surface of the second lens L2 is convex in the paraxial region. The object-side surface of the sixth lens L6 is convex in the paraxial region, and the image-side surface of the sixth lens L6 is convex in the paraxial region. The sixth lens L6 has a positive refractive power.

Table 9 shows design data of the camera optical lens 30 in the third embodiment of the present disclosure.

TABLE 9

| | R | d | nd | | vd | |
|---|---|---|---|---|---|---|
| S1 | ∞ | d0 = −1.064 | | | | |
| R1 | 2.196 | d1 = 1.432 | nd1 | 1.5342 | v1 | 66.00 |
| R2 | −11.765 | d2 = 0.168 | | | | |
| R3 | −11.974 | d3 = 0.331 | nd2 | 1.5661 | v2 | 37.71 |
| R4 | −2197.050 | d4 = 0.219 | | | | |
| R5 | −3.304 | d5 = 0.309 | nd3 | 1.6153 | v3 | 25.94 |
| R6 | 20.540 | d6 = 0.284 | | | | |
| R7 | 5.233 | d7 = 0.292 | nd4 | 1.6700 | v4 | 19.39 |
| R8 | 9.112 | d8 = 2.022 | | | | |
| R9 | 16.072 | d9 = 0.256 | nd5 | 1.5444 | v5 | 55.82 |
| R10 | 4.586 | d10 = 0.195 | | | | |
| R11 | 485.019 | d11 = 0.982 | nd6 | 1.6701 | v6 | 19.39 |
| R12 | −732.362 | d12 = 0.250 | | | | |
| R13 | ∞ | d13 = 0.210 | ndg | 1.5168 | vg | 64.17 |
| R14 | ∞ | d14 = 0.541 | | | | |

Table 10 shows aspherical surface data of each lens of the camera optical lens 30 in the third embodiment of the present disclosure.

TABLE 10

| | Conic coefficient | Aspheric surface coefficients | | | | |
|---|---|---|---|---|---|---|
| | k | A4 | A6 | A8 | A10 | A12 |
| R1 | 0.0000E+00 | −3.9002E−04 | −1.5090E−03 | 2.9304E−03 | −3.1209E−03 | 1.9652E−03 |
| R2 | −9.9000E+01 | 5.6373E−02 | −3.8815E−02 | 2.3234E−02 | −9.8006E−03 | 2.6511E−03 |
| R3 | −6.5523E+01 | 9.5329E−02 | −1.0101E−01 | 8.7662E−02 | −5.8600E−02 | 2.9580E−02 |
| R4 | −9.9000E+01 | 1.6225E−02 | −4.6006E−02 | 7.6339E−02 | −7.8557E−02 | 5.8238E−02 |
| R5 | 1.4957E+00 | 3.6460E−02 | 1.1416E−01 | −1.8384E−01 | 1.7354E−01 | −1.0848E−01 |
| R6 | 3.0034E+01 | −1.3150E−02 | 1.7822E−01 | −2.6292E−01 | 2.4250E−01 | −1.6026E−01 |
| R7 | −1.0230E+01 | −1.4163E−01 | 8.7249E−02 | −9.0382E−02 | 5.6051E−02 | −6.5441E−03 |
| R8 | 1.8043E+01 | −8.3279E−02 | 2.4079E−02 | 5.3961E−03 | −3.8401E−02 | 6.0684E−02 |
| R9 | −4.1014E+00 | −4.5570E−02 | −7.8772E−03 | 6.9696E−03 | −1.6830E−03 | 2.0635E−04 |
| R10 | 1.4547E+00 | −3.8305E−02 | −7.5599E−03 | 8.1892E−03 | −3.3458E−03 | 7.5303E−04 |
| R11 | 9.9000E+01 | −1.4540E−02 | 7.9348E−03 | −2.7155E−03 | 3.7798E−04 | −2.5892E−05 |
| R12 | −9.9000E+01 | −3.0446E−02 | 9.7514E−03 | −3.1901E−03 | 8.9138E−04 | −1.9168E−04 |

| | Conic coefficient | Aspheric surface coefficients | | | |
|---|---|---|---|---|---|
| | k | A14 | A16 | A18 | A20 |
| R1 | 0.0000E+00 | −7.5105E−04 | 1.6956E−04 | −2.0586E−05 | 9.9103E−07 |
| R2 | −9.9000E+01 | −4.3122E−04 | 4.0457E−05 | −2.0159E−06 | 4.1327E−08 |
| R3 | −6.5523E+01 | −1.0548E−02 | 2.4847E−03 | −3.3650E−04 | 1.9459E−05 |
| R4 | −9.9000E+01 | −2.8886E−02 | 8.6264E−03 | −1.2586E−03 | 4.7872E−05 |
| R5 | 1.4957E+00 | 4.4239E−02 | −1.1020E−02 | 1.4816E−03 | −8.0417E−05 |
| R6 | 3.0034E+01 | 7.3687E−02 | −2.2270E−02 | 3.8701E−03 | −2.8507E−04 |
| R7 | −1.0230E+01 | −2.3696E−02 | 2.1636E−02 | −8.0907E−03 | 1.1366E−03 |
| R8 | 1.8043E+01 | −4.9176E−02 | 2.3004E−02 | −5.6728E−03 | 5.5662E−04 |
| R9 | −4.1014E+00 | −1.2241E−05 | 1.8153E−07 | 1.2594E−08 | −4.2875E−10 |
| R10 | 1.4547E+00 | −9.9122E−05 | 7.5098E−06 | −3.0088E−06 | 4.9163E−09 |
| R11 | 9.9000E+01 | 9.7404E−07 | −2.0638E−08 | 2.3200E−10 | −1.0805E−12 |
| R12 | −9.9000E+01 | 2.7317E−05 | −2.3986E−06 | 1.1760E−07 | −2.4434E−09 |

Table 11 and Table 12 show design data inflexion points and arrest points of the respective lenses in the camera optical lens 30 according to the third embodiment of the present disclosure.

TABLE 11

| | Number(s) of inflexion points | Inflexion point position 1 | Inflexion point position 2 |
|---|---|---|---|
| P1R1 | 0 | / | / |
| P1R2 | 1 | 0.375 | / |
| P2R1 | 1 | 0.295 | / |
| P2R2 | 2 | 0.055 | 1.515 |
| P3R1 | 1 | 0.645 | / |
| P3R2 | 1 | 1.155 | / |
| P4R1 | 1 | 0.355 | / |
| P4R2 | 2 | 0.365 | 1.105 |
| P5R1 | 2 | 0.335 | 2.015 |
| P5R2 | 2 | 0.705 | 2.655 |
| P6R1 | 2 | 0.115 | 2.725 |
| P6R2 | 1 | 2.965 | / |

TABLE 12

| | Number of arrest points | Arrest point position 1 | Arrest point position 2 |
|---|---|---|---|
| P1R1 | 0 | / | / |
| P1R2 | 1 | 0.715 | / |
| P2R1 | 1 | 0.565 | / |
| P2R2 | 1 | 0.085 | / |
| P3R1 | 1 | 1.265 | / |
| P3R2 | 0 | / | / |
| P4R1 | 1 | 0.635 | / |
| P4R2 | 2 | 0.645 | 1.285 |
| P5R1 | 1 | 0.565 | / |
| P5R2 | 1 | 1.285 | / |

TABLE 12-continued

| | Number of arrest points | Arrest point position 1 | Arrest point position 2 |
|---|---|---|---|
| P6R1 | 1 | 0.195 | / |
| P6R2 | 0 | / | / |

Figure 10:
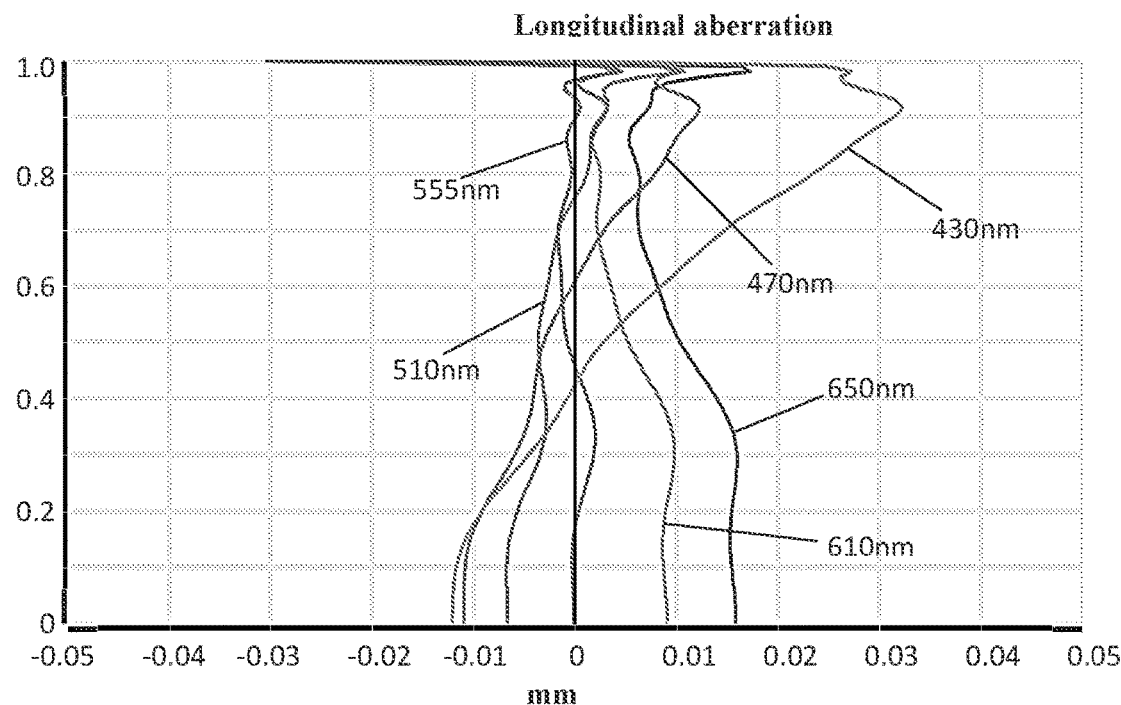
FIG. 10 is a schematic diagram of a longitudinal aberration of the camera optical lens shown in FIG. 9.
Figure 11:
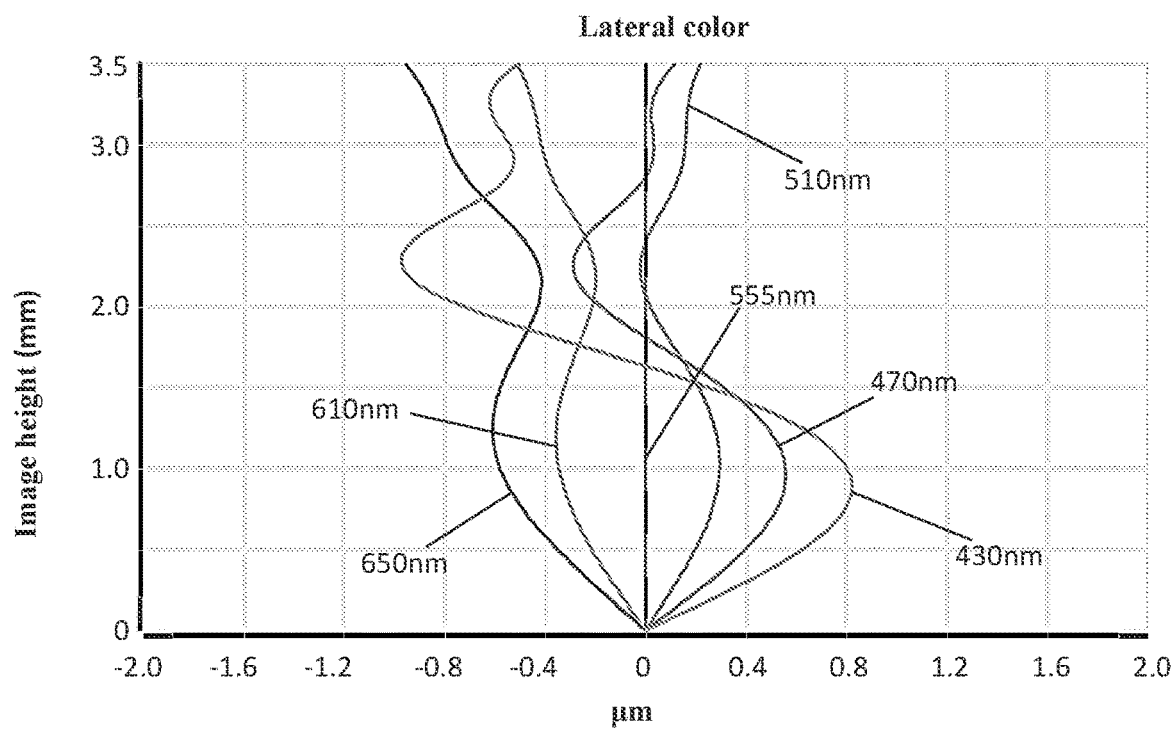
FIG. 11 is a schematic diagram of a lateral color of the camera optical lens shown in FIG. 9.
Figure 12:
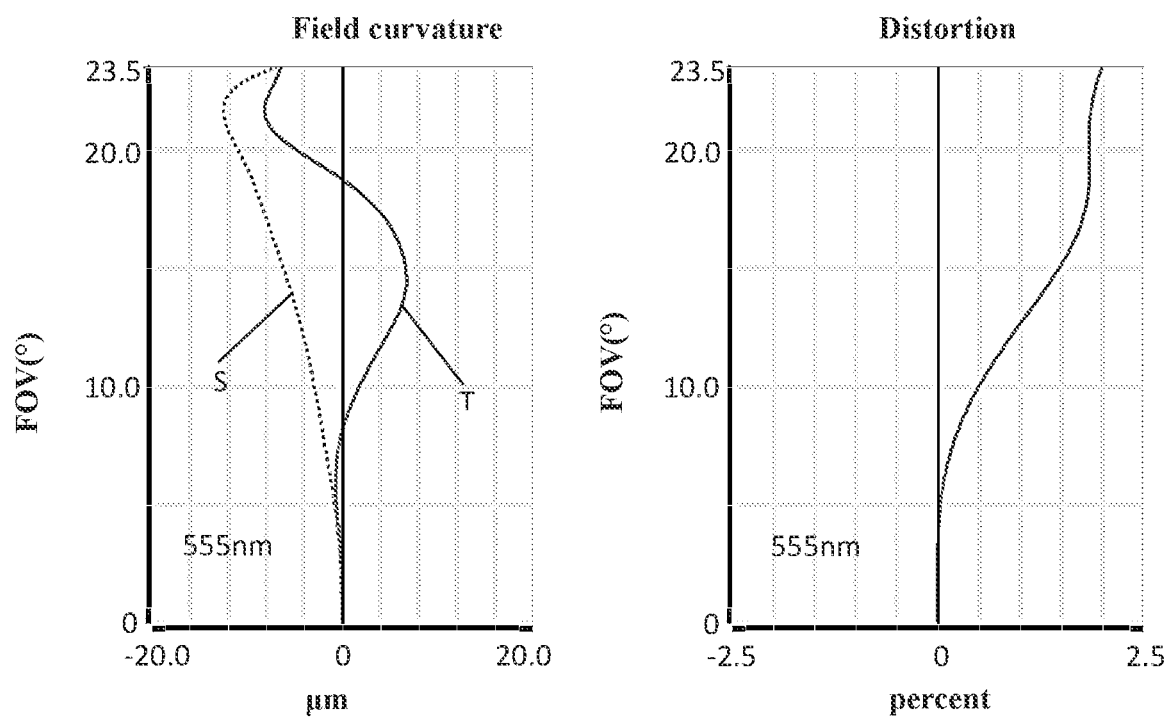
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 430 nm, 470 nm, 510 nm, 555 nm, 610 nm and 650 nm after passing the camera optical lens 30 according to the third embodiment, respectively. FIG. 12 illustrates a field curvature and a distortion of light with a wavelength of 555 nm after passing the camera optical lens 30 according to the third embodiment. In FIG. 12, a field curvature S is a field curvature in a sagittal direction, and T is a field curvature in a meridional direction.

As shown in Table 13, the third embodiment satisfies the above conditions.

In this Embodiment, an entrance pupil diameter (ENPD) of the camera optical lens 30 is 3.946 mm, an image height (IH) of 1.0H is 3.500 mm, a field of view (FOV) in a diagonal direction is 47.00°. Thus, the camera optical lens 30 meets the design requirements of large aperture, long focal length and ultra-thin. Its on-axis and off-axis aberrations are fully corrected, thereby achieving excellent optical characteristics.

Table 13 in the following lists values corresponding to the respective conditions in the first, second and third embodiment according to the above conditions, as well as values of other related parameters.

TABLE 13

| Parameters and conditions | Fist embodiment | Second embodiment | Third embodiment |
| --- | --- | --- | --- |
| f | 7.892 | 7.891 | 7.892 |
| f1 | 4.048 | 4.441 | 3.583 |
| f2 | −24.323 | −30.701 | −21.166 |
| f3 | −6.269 | −5.852 | −4.571 |
| f4 | 31.170 | 11.916 | 17.643 |
| f5 | −11.911 | −11.084 | −11.843 |
| f6 | −492.541 | −41.567 | 431.604 |
| f12 | 4.533 | 4.865 | 4.085 |
| FNO | 2.00 | 2.00 | 2.00 |
| TTL | 7.490 | 7.491 | 7.491 |
| IH | 3.500 | 3.500 | 3.500 |
| FOV | 47.00° | 47.00° | 47.00° |
| v1 | 76.60 | 89.60 | 66.00 |
| d8/d9 | 4.90 | 2.05 | 7.90 |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. A camera optical lens, comprising six lenses, the six lenses from an object side to an image side being:
   a first lens having a positive refractive power;
   a second lens having a negative refractive power;
   a third lens having a negative refractive power;
   a fourth lens with a positive refractive power;
   a fifth lens with a negative refractive power and
   a sixth lens with a negative refractive power;
   wherein the camera optical lens satisfies the following conditions:

$65.00 \leq v1 \leq 90.00$;

$2.00 \leq d8/d9 \leq 8.00$;

$-1.59 \leq f3/f \leq -0.39$;

$-1.45 \leq (R5+R6)/(R5-R6) \leq -0.36$;

$0.02 \leq d5/TTL \leq 0.07$;

where
   v1 denotes an abbe number of the first lens,
   d8 denotes an on-axis distance from an image-side surface of the fourth lens to an object-side surface of the fifth lens,
   d9 denotes an on-axis thickness of the fifth lens,
   f denoted a focal length of the camera optical lens,
   f3 denotes a focal length of the third lens,
   R5 denotes a central curvature radius of an object-side surface of the third lens,
   R6 denotes a central curvature radius of an image-side surface of the third lens,
   d5 denotes an on-axis thickness of the third lens and
   TTL denotes a total optical length from the object-side surface of the first lens to an image surface of the camera optical lens along an optical axis.

2. The camera optical lens according to claim 1, further satisfying the condition of:

$1.50 \leq f4/f \leq 4.00$;

wherein,
   f4 denotes a focal length of the fourth lens.

3. The camera optical lens according to claim 1, further satisfying the condition of:

$R12/R11 \leq -1.50$;

wherein,
   R11 denotes a central curvature radius of an object-side surface of the sixth lens, and
   R12 denotes a central curvature radius of an image-side surface of the sixth lens.

4. The camera optical lens according to claim 1, further satisfying the following conditions:

$0.23 \leq f1/f \leq 0.84$;

$-1.87 \leq (R1+R2)/(R1-R2) \leq -0.46$;

$0.09 \leq d1/TTL \leq 0.30$;

wherein,
   f1 denotes a focal length of the first lens,
   R1 denotes a central curvature radius of an object-side surface of the first lens,
   R2 denotes a central curvature radius of an image-side surface of the first lens,
   d1 denotes an on-axis thickness of the first lens.

5. The camera optical lens according to claim 1, further satisfying the following conditions:

$-7.78 \leq f2/f \leq -1.79$;

$-2.02 \leq (R3+R4)/(R3-R4) \leq 4.85$;

$0.02 \leq d3/TTL \leq 0.07$;

wherein
   f2 denotes a focal length of the second lens,
   R3 denotes a central curvature radius of an object-side surface of the second lens,
   R4 denotes a central curvature radius of an image-side surface of the second lens,
   d3 denotes an on-axis thickness of the second lens.

6. The camera optical lens according to claim 1, further satisfying the following conditions:

$-7.93 \leq ((R7+R8)/(R7-R8) \leq -1.42$;

$0.02 \leq d7/TTL \leq 0.07$;

wherein
   R7 denotes a central curvature radius of an object-side surface of the fourth lens,
   R8 denotes a central curvature radius of an image-side surface of the fourth lens,
   d7 denotes an on-axis thickness of the fourth lens.

7. The camera optical lens according to claim 1, further satisfying the following conditions:

$-3.02 \leq f5/f \leq -0.94$;

$0.85 \leq (R9+R10)/(R9-R10) \leq 2.96$;

$0.02 \leq d9/TTL \leq 0.10$;

wherein
   f5 denotes a focal length of the fifth lens,
   R9 denotes a central curvature radius of an object-side surface of the fifth lens,
   R10 denotes a central curvature radius of an image-side surface of the fifth lens.

8. The camera optical lens according to claim 1, further satisfying the following conditions:

$-124.82 \leq f6/f \leq 82.03$;

$-1.77 \leq (R11+R12)/(R11-R12) \leq -0.14$;

$0.05 \leq d11/TTL \leq 0.20$;

wherein
f6 denotes a focal length of the sixth lens,
R11 denotes a central curvature radius of an object-side surface of the sixth lens,
R12 denotes a central curvature radius of an image-side surface of the sixth lens,
d11 denotes an on-axis thickness of the sixth lens.

9. The camera optical lens according to claim 1, further satisfying the condition of:

$TTL/IH \leq 2.15$;

wherein
IH denotes an image height of the camera optical lens.

10. The camera optical lens according to claim 1, further satisfying the condition of:

$f/IH \geq 2.20$;

wherein
IH denotes an image height of the camera optical lens.

11. The camera optical lens according to claim 1, wherein the first lens is made of glass material.

* * * * *